UNITED STATES PATENT OFFICE.

FRANK KUNKEL, OF CHICAGO, ILLINOIS, ASSIGNOR TO WM. B. MILNE, OF SAME PLACE.

IMPROVEMENT IN THE MANUFACTURE OF SOAP.

Specification forming part of Letters Patent No. 50,877, dated November 7, 1865.

*To all whom it may concern:*

Be it known that I, FRANK KUNKEL, of the city of Chicago, county of Cook, State of Illinois, have discovered a new composition of matter to be used in making soap; and I do hereby declare that the following is a full, clear, and exact description of the same and the manner of using the same in the manufacture of soap.

The nature and object of my invention or discovery consists in making a composition to be used in the manufacture of soap, which composition shall of itself be an article of commerce, and be, in fact, a new article of manufacture, as said composition does not require to be immediately used in the manufacture of soap, as in the case of the several compounds of vegetable matter combined with an alkali heretofore known in combining potatoes with common lye or other alkali suitable for soap-making and creosote or other suitable antiseptic or preservative, and in a new process of treating potatoes boiled with the skins on, so as to avoid waste and the difficulties heretofore experienced in treating boiled potatoes with an alkaline solution.

To enable others skilled in the art to make and use my invention or discovery, I will state the process of its manufacture and composition and the manner of using the same in producing soap.

I first boil my potatoes—as those are the principal vegetable substance, although some others may be used in place of them—until they are soft, with the skins on, so that there is no waste of material, and then take them out and mash or powder them finely. I then take common lye, such as is used in soap-making, or caustic soda, potash, or other suitable alkali reduced to about the strength of common lye. (I am not sufficiently familiar with the use of a hydrometer to give the strength by degrees.) I then take equal parts, by weight, of the mashed potatoes and prepared alkali and put them together and steam or boil them at that stage about two hours, when it will be found that the skins are thoroughly combined with and absorbed by the alkali, as well as the other parts of the potato, and no waste occurs, although the potatoes were previously boiled. In this way I overcome a difficulty which has heretofore existed in using potatoes which were boiled soft previous to their mixture with an alkali, as by the methods before known or used it was necessary to remove the skins of the potatoes when so boiled. When desired for immediate used the composition, as now prepared, is sufficient, and the process is completed by adding grease, resin, and other materials as is usual in soap-making.

I am aware that the use of potatoes and other vegetable substances have been used heretofore in soap-making; and at this point in the process I claim nothing except the manner of treating the potatoes preparatory to combining them with an alkali, and the combining of them by a protracted boiling after they have been put together, so as to combine the alkali with the skins and other parts without waste.

When I make the compound to put in the market without making it into soap I then add one ounce of creosote to one hundred pounds of the compound and mix thoroughly to preserve it from souring or decomposing.

Other antiseptics having a preservative effect may be used in place of creosote. Chloride of lime may also be used in making the compound and will preserve it a few days, but its principal use is to cleanse the compound and make the soap clearer. For this purpose, for every one hundred pounds of mashed potatoes take two pounds of chloride of lime, add three gallons of water, stir it well, and let it stand at least half an hour; then, rejecting the sediment, put the fluid into the boiling potato, lye, and water, and let the whole boil together for two or three minutes. Arsenic is still better than creosote; but as it would be dangerous in case of sores, I do not use it; and I find, by experiment, that creosote will preserve it in a liquid state a sufficient length of time unless in very hot weather, and when dried will preserve it for years; I therefore consider that the best for all purposes.

When this compound is used for making soap it is in a creamy liquid state, and when mixed with the other ingredients used in soap-making should be of the same temperature as the other materials.

In making hard or cold soaps this composition takes the place of silica and ammonia, using about the same quantity of the compound as would be used of such silica and ammonia; and without the use of coloring-matter I can produce in this manner mottled soaps of a superior quality and appearance.

Further uses of this compound will be understood by soap-makers, and for producing lighter-colored soaps I use a less quantity of alkali than the proportion above given; but in that event the boiling must be continued longer in proportion as a less quantity is used, as the continual boiling is a necessary part of my method of treating potatoes for soap-making purposes.

I can also use this compound successfully in making what is commonly known as "red-oil soap," or soap which is made from oleine or olein and margarine, which are the residium of fatty substances which have been chemically treated to extract the sterine and glycerine, which, owing to their previous chemical treatment, soap-makers have found it to be impossible to mix with the ingredients heretofore used in mixing soaps made from the ordinary substances.

This compound, when made with lye or potash, is of a reddish-brown color, and is of a light color when made with soda. Soda or potash will therefore be used as either color may be desired.

This compound does not injure the quality of the soap nor diminish its strength, as I have found from actual use and tests made by myself and others, and this method of treating potatoes and pressing the compound for marketable purposes overcomes the obstacles which have heretofore prevented the use of potatoes and other vegetable substances from being generally used in soap-making.

I do not claim as my invention or discovery the use of potatoes or other vegetable substances for soap-making purposes; but

What I claim as new, and desire to secure by Letters Patent, is—

1. The process herein described of treating potatoes which have been previously boiled with the skins on, with an alkali, and subsequent boiling, substantially as set forth.

2. The compound or composition of matter formed of boiled potatoes, alkali, and creosote, or other antiseptic, substantially as and for the purposes set forth.

FR. KUNKEL.

In presence of—
E. A. WEST,
M. D. BAUTELL.